(12) United States Patent
Bickerstaff et al.

(10) Patent No.: US 9,470,893 B2
(45) Date of Patent: Oct. 18, 2016

(54) HEAD MOUNTABLE DEVICE

(71) Applicant: Sony Computer Entertainment Europe Limited, London (GB)

(72) Inventors: Ian Henry Bickerstaff, London (GB); Simon Mark Benson, London (GB)

(73) Assignee: Sony Computer Entertainment Europe Limited (GB)

( * ) Notice: Subject to any disclaimer, the term of this patent is extended or adjusted under 35 U.S.C. 154(b) by 29 days.

(21) Appl. No.: 14/433,189

(22) PCT Filed: Oct. 10, 2013

(86) PCT No.: PCT/GB2013/052645
§ 371 (c)(1),
(2) Date: Apr. 2, 2015

(87) PCT Pub. No.: WO2014/057275
PCT Pub. Date: Apr. 17, 2014

(65) Prior Publication Data
US 2015/0260993 A1     Sep. 17, 2015

Related U.S. Application Data (63) Continuation-in-part of application No. 13/649,425, filed on Oct. 11, 2012, now abandoned.

(51) Int. Cl.
*G09G 5/00*     (2006.01)
*G02B 27/01*    (2006.01)
(Continued)

(52) U.S. Cl.
CPC ....... *G02B 27/0172* (2013.01); *G02B 27/0093* (2013.01); *G02B 27/017* (2013.01);
(Continued)

(58) Field of Classification Search
CPC ........ G06F 3/012; G06F 3/013; G06F 3/015; G02B 27/0172; G02B 27/017; G02B 27/0093; G02B 2027/0154; G02B 2027/0187; G02B 27/176; G02B 2027/0138

USPC .......................................................... 345/7–9
See application file for complete search history.

(56) References Cited

U.S. PATENT DOCUMENTS

| | | |
|---|---|---|
| 6,085,112 A | 7/2000 | Kleinschmidt et al. |
| 6,396,639 B1 | 5/2002 | Togino et al. |

(Continued)

FOREIGN PATENT DOCUMENTS

| | | |
|---|---|---|
| EP | 1731943 A1 | 12/2006 |
| JP | 2008113416 A | 5/2008 |

(Continued)

OTHER PUBLICATIONS

International Search Report and Written Opinion for Application No. PCT/GB2013/052645 dated Mar. 13, 2014.

*Primary Examiner* — Vijay Shankar
(74) *Attorney, Agent, or Firm* — Lerner, David, Littenberg, Krumholz & Mentlik, LLP (57) ABSTRACT

A head-mountable display device includes a head-mountable frame defining an eye display position which, in use, is positioned in front of an eye of the user. The device also includes a reflective element mounted with respect to the eye display position and comprising a reflective surface which, in use, is visible to the user's eye. The device further includes a mobile device holder configured to hold a mobile device at a location and orientation on the frame. The reflective surface is configured to reflect light incident thereupon to form a reflected image. The location and orientation in which the mobile device is held relative to a location and orientation of the reflective surface are such that light arriving from the mobile device screen held in the holder is reflected by the surface so that a reflected image of at least a portion of the screen is visible to the user.

5 Claims, 5 Drawing Sheets

(51) Int. Cl.
  *G06F 3/01*   (2006.01)
  *G02B 27/00*  (2006.01)
(52) U.S. Cl.
  CPC ........... *G02B27/0176* (2013.01); *G06F 3/012* (2013.01); *G06F 3/013* (2013.01); *G02B 2027/0138* (2013.01); *G02B 2027/0154* (2013.01); *G02B 2027/0187* (2013.01)

(56) References Cited

U.S. PATENT DOCUMENTS

| | | | |
|---|---|---|---|
| 6,747,612 B1 | 6/2004 | Knox | |
| 7,145,726 B2 * | 12/2006 | Geist | G02B 27/0172 |
| | | | 345/7 |
| 7,936,519 B2 * | 5/2011 | Mukawa | G03B 21/26 |
| | | | 359/630 |
| 8,488,246 B2 | 7/2013 | Border et al. | |
| 8,957,835 B2 * | 2/2015 | Hoellwarth | G02B 27/017 |
| | | | 345/8 |
| 9,250,444 B2 * | 2/2016 | Magyari | G02B 27/0172 |
| 2005/0041297 A1 | 2/2005 | He et al. | |
| 2005/0078378 A1 | 4/2005 | Geist | |
| 2009/0109404 A1 | 4/2009 | Thornton | |
| 2010/0079356 A1 | 4/2010 | Hoellwarth | |
| 2010/0157433 A1 | 6/2010 | Mukawa et al. | |
| 2012/0033195 A1 | 2/2012 | Tai | |
| 2012/0050144 A1 | 3/2012 | Morlock | |
| 2012/0120499 A1 | 5/2012 | Harrison et al. | |
| 2012/0229367 A1 | 9/2012 | Magyari | |
| 2013/0141360 A1 | 6/2013 | Compton et al. | |

FOREIGN PATENT DOCUMENTS

| | | |
|---|---|---|
| WO | 9818038 A1 | 4/1998 |
| WO | 0243041 A1 | 5/2002 |

* cited by examiner

HEAD MOUNTABLE DEVICE

CROSS REFERENCE TO RELATED APPLICATIONS

The present application is a national phase entry under 35 U.S.C. §371 of International Application No. PCT/GB2013/052645 filed Oct. 10, 2013, published in English, which claims the benefit of and priority to U.S. patent application Ser. No. 13/649,425, filed Oct. 11, 2012, the entire disclosures of which are hereby incorporated by reference herein.

BACKGROUND

1. Field of the Invention

This invention relates to head-mountable devices.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is an image or video display device which may be worn on the head or as part of a helmet or other head mounted frame. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

It is to be understood that both the foregoing general description of the invention and the following detailed description are exemplary, but are not restrictive, of the invention.

SUMMARY

In a first aspect, the present invention provides a head-mountable display device, comprising:

a frame to be mounted onto a user's head, the frame defining an eye display position which, in use, is positioned in front of an eye of the user;

a reflective element mounted with respect to the eye display position, the reflective element comprising a reflective surface which, in use, is visible to the eye of the user; and a mobile device holder configured to hold a mobile device at a location and orientation on the frame; wherein the reflective surface is configured to reflect light incident upon the reflective surface so as to form a reflected image; and the location and orientation in which the mobile device is held relative to a location and orientation of the reflective surface are such that, in use, light arriving from a screen of the mobile device held in the mobile device holder is reflected by the reflective surface so that a reflected image of at least a portion of the screen is visible to the user.

The present invention recognises that a problem facing the use of HMDs by casual users is that the technological complexity of the custom-built display device(s) and associated optics within HMDs often results in their being undesirably heavy, cumbersome and/or costly. The present invention can help to alleviate this problem by providing an HMD which uses a reflective element comprising a reflective surface in place of the custom-built display device(s) and associated optics found within traditional HMDs. Images to be displayed are then generated on a screen of a generic mobile device, such as a mobile telephone or hand-held games console, which is held on a frame of the HMD in such a way that the generated images are reflected by the reflective surface of the reflective element. The reflected images can then be seen by a user wearing the HMD. The reflective element can be built to be much simpler and lighter than the custom-built display device(s) and associated optics found within traditional HMDs, and at a much lower cost. This results in the HMD of the present invention being potentially lighter, smaller and available at a very low cost compared to traditional HMDs.

The HMD of the present invention can easily be made to be compatible with a wide range of common mobile devices which may already be owned by users, since all that is required is that the HMD is able to hold a mobile device on the frame. This is easily achievable with modern mobile devices, which are becoming increasingly thinner and lighter.

In a second aspect, the present invention provides a head-mountable device, comprising:

a frame to be mounted onto a user's head, the frame defining an eye-tracking reflection position which, in use, is positioned in front of an eye of the user;

a reflective element mounted with respect to the eye-tracking reflection position, the reflective element comprising a reflective surface which is located and orientated so as to, in use, reflect light arriving from the eye of the user; and a mobile device holder configured to hold a mobile device at a location and orientation on the frame; wherein the reflective surface is configured to reflect light incident upon the reflective surface so as to form a reflected image; and the location and orientation in which the mobile device is held relative to the location and orientation of the reflective surface are such that, in use, the light arriving from the eye of the user is reflected by the reflective surface so that a reflected image of the eye of the user is within the field of view of a camera of the mobile device.

This aspect of the present invention uses a similar principle to that of the first aspect, although in this case, it is a reflected image of an eye of the user wearing the head-mounted device which is visible to a camera of the mobile device held on the frame. This allows a mobile device comprising an eye-tracking facility to track the eye of the user using the reflected image. Various operations can then be performed by the mobile device based on the tracked eye movements. Advantageously, when wearing the head-mounted device of the present invention, the user does not have to hold anything in their hands or act differently from the way in which they would naturally act. The eye-movements of the user which are tracked are therefore more natural eye movements. This improves the quality of the output of subsequent operations performed on the basis of the tracked eye movements.

The first and second aspects of the present invention may be combined so as to form a head-mounted display device for displaying images generated by a mobile device to a user whilst, simultaneously, allowing the eye movements of the user to be tracked using a camera of the mobile device. Advantageously, when appropriate processing is carried by the mobile device, this allows the user to interact with an application on the mobile device using only their eye movements.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
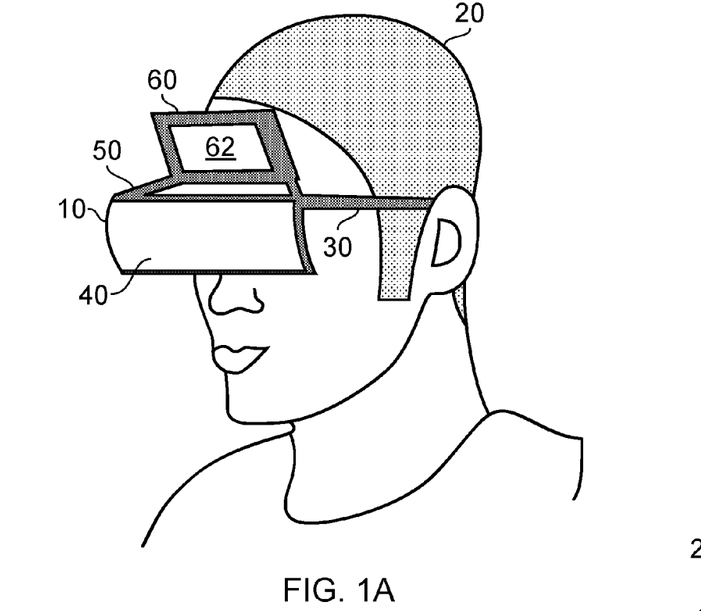
FIGS. 1A and 1B schematically illustrate an HMD.

Referring now to the drawings, FIG. 1A shows a head-mountable display device (HMD) 10 according to an embodiment of the present invention. In order to clearly demonstrate the way in which the HMD 10 operates, it is illustrated in a situation in which it is mounted on the head of a user 20.

The HMD 10 comprises a frame 30 which allows the HMD to be mounted on the head of the user. In this particular example, the frame 30 is similar to the frames used in ordinary spectacles. There are, however, many different variations that could be used. The frame could, for example, be comprised within a hat or helmet which is worn by the user. Accordingly, the frame 30 provides a frame to be mounted onto a user's head, the frame defining an eye display position which, in use, is positioned in front of an eye of the user. In embodiments, the eye display position is occupied by a reflective element, to be described below.

The frame 30 defines an eye display position which is positioned in front of the eyes of the user. It would also be acceptable for the eye display position to be positioned in front of a single eye of the user. A reflective element 40 is mounted with respect to the eye display position. The reflective element may comprise a reflective surface which, in use, is visible to the eye of the user and which is configured to reflect light incident upon the reflective surface so as to form a reflected image. The reflective element 40 is discussed in more detail later.

The HMD 10 comprises a mobile device holder 50 for holding a mobile device 60, such as a mobile telephone or hand-held games console. The mobile device comprises a display screen 62. The mobile device holder is configured to hold the mobile device at a location and orientation on the frame, such as a location in which the mobile device does not itself block the forward line of sight of the user, or in other words, so that the mobile device does not itself occupy the eye display position. The mobile device holder may be fixed, so that the location and orientation in which the mobile device is held does not change, or may be movable, so that the location and orientation in which the mobile device is held may be changed, for example by the user manually releasing a catch, detent or lock (not shown) to allow changes, and then reimposing the catch so as to avoid inadvertent movement of the mobile device with respect to the rest of the frame while in use. In either case, the location and orientation in which the mobile device is held are relative to a location and orientation of the reflective surface are such that, in use, light arriving from a screen of the mobile device held in the mobile device holder is reflected by the reflective surface so that a reflected image of at least a portion of the screen is visible to the user.

Any suitable method known in the art could be used for holding the mobile device 60 on or in the mobile device holder 50. For example, a clamp system could be used in which the mobile device is clamped into place. Alternatively, the mobile device 60 could comprise a first adhesive or hook-and-loop patch and the mobile device holder could comprise a second, complementary adhesive or hook-and-loop patch, so that when the first and second adhesive patches come into contact, the mobile device is held in place on the mobile device holder. The shape and size of the mobile device holder, together with the method for holding the mobile device on or in the mobile device holder, can be chosen so as to allow a wide range of mobile devices of different size and shape to be held by the mobile device holder.

Figure 1B:
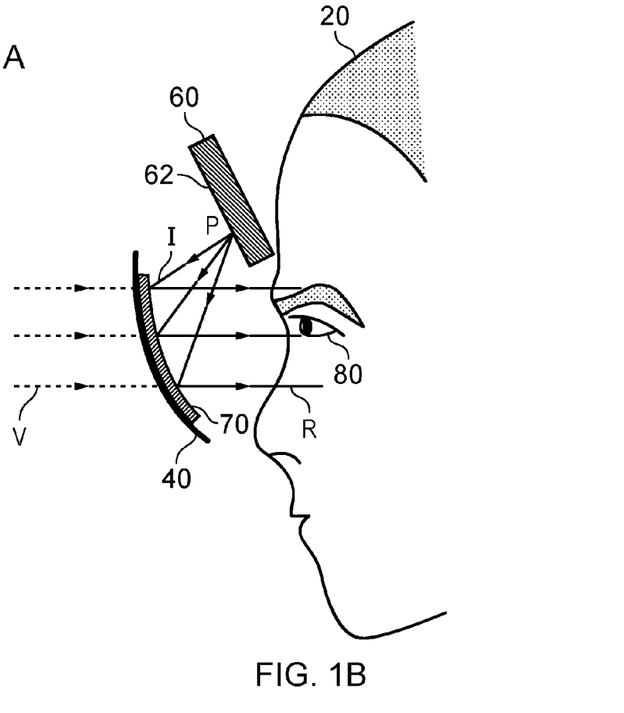

FIG. 1B shows the arrangement of FIG. 1A from a different perspective, and schematically illustrates the operation the HMD 10 in more detail. In order to improve the clarity of FIG. 1B, the frame 30 and mobile device holder 50 have been omitted from the drawing.

The reflective element 40 comprises a reflective surface 70 which is visible to the eye 80 of the user 20. The reflective surface 70 is configured to reflect light incident upon it so as to form a reflected image. The location and orientation in which the mobile device 60 is held relative to the location and orientation of the reflective surface 70 are such that light arriving from the screen 62 of the mobile device is reflected by the reflective surface so that a reflected image of at least a portion of the screen is visible to the observer. Thus, in this way, an image generated on the screen 62 of the mobile device 60 is visible to the user as a reflection on the reflective surface 70.

In this embodiment, the reflective surface 70 forms or comprises a concave mirror. Schematic light rays are shown which illustrate light arriving from the screen 62 of the mobile device 60 and being reflected by the reflective surface 70. Specifically, incident light rays I arrive from a single point P on the screen and are reflected by the reflective surface as reflected light rays R. The reflected light rays R define a virtual image of the single point on the screen, the position of which can be determined by extrapolating the reflected light rays R behind the reflective surface 70 as virtual light rays V.

In this particular case, the reflected light rays R are collimated, meaning that the virtual image appears at an infinite distance behind the reflective surface 70. This is a result of the single point on the screen being positioned at a distance from the reflective surface which is equal to the focal length of the concave mirror formed by the reflective surface. The size of the virtual image will be magnified as the screen is moved to a position with a distance from the reflective surface which is closer than the focal length of the concave mirror. That is, the reflected image of the screen will appear larger than the actual, real-life size of the screen in this case. Thus, advantageously, by using a reflective surface which forms a concave mirror, with at least a portion of the screen of the mobile device being less than or equal to the focal length of the mirror from the concave mirror, a magnified view of images displayed on the screen can be seen by the user.

An example of a suitable reflective surface is a portion of a spherical mirror. Alternatively a parabolic reflector could be used, or a mirror which has one curvature in a vertical image direction and another curvature in a horizontal image direction. The reflective surface may be fully reflective (substantially 100% reflectivity, or in other words as near to 100% as reasonably priced technology allows, for example more than 98% or more than 99% reflective), partially transparent (and therefore partially reflective, for example, 30-80% reflective and 20%-70% transparent) or switchable between a fully reflective and a partially reflective mode (as described in more detail below).

For an image to appear at infinity, theoretically the radius of curvature of the mirror would be twice the distance of the display from the mirror. For example, placing the mirror 10 cm from the display would require a 20 cm radius spherical concave mirror. An embodiment of the invention has the display positioned at 10 cm from the mirror but is designed to place the virtual image slightly closer than infinity and so the mirror's radius of curvature is approximately 27 cm. In other embodiments, the off-axis nature of the design may be catered for by using a more complex shape such as a parabolic shape The reflective surface may be manufactured from a plastics or acrylic material such as Perspex. The reflective surface may be manufactured from a single piece of such material.

Alternatives to reflective surfaces using mirrors as described include the use of a Fresnel component to allow a wider range of curvatures to be used without altering the optical properties. Fresnel reflectors can be created by known techniques on flat substrates but to have the properties of curved reflectors, by making use of an array of very small micro-mirrors, each with slightly different reflection angles so that, taken together, they provide similar properties to a curved mirror. Alternatively it is possible to use a flat mirror and a beam splitter, with a collimation lens in front of the display, so that diverging light from the display is collimated into parallel light (as though coming from a virtual image at infinity) which can then be reflected by an angled, but flat, mirror towards the viewer.

In general terms, in embodiments of the invention the arrangement gives the impression to the user that the user is seeing the display in front of his or her face, though at infinity (or at least a distance of more than, say, 1 m from the user), and that the display size is greatly enlarged when compared to the physical display screen 62.

Figure 2A:
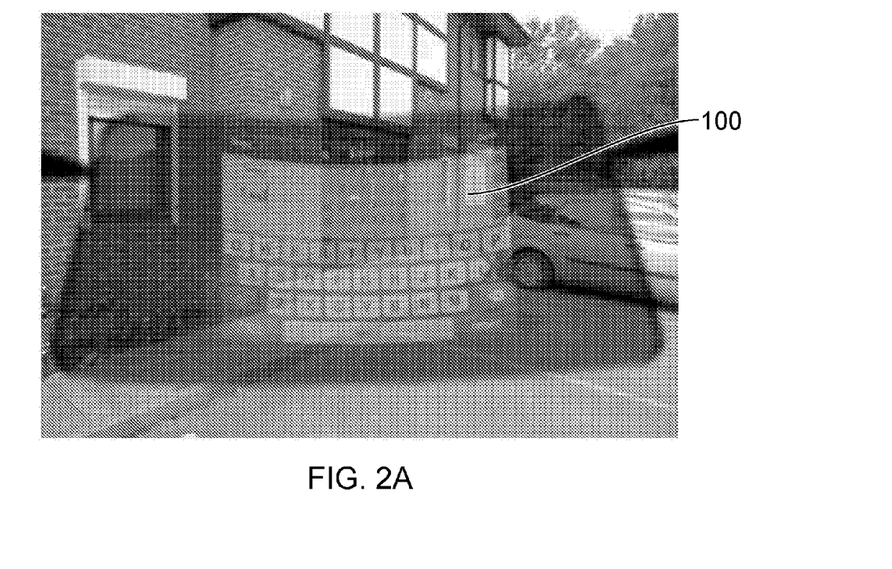
FIGS. 2A and 2B schematically illustrate the user's view when using the HMD of FIG. 1.
Figure 2B:
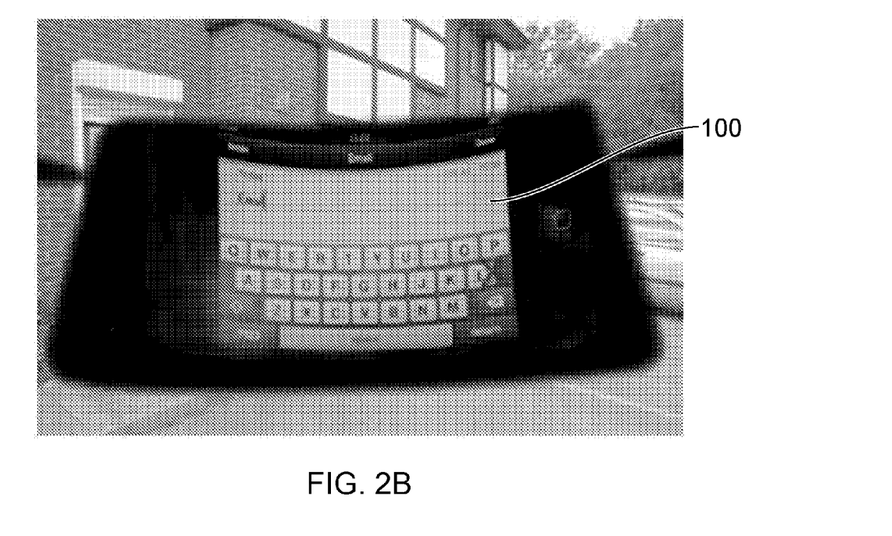

FIGS. 2A and 2B schematically illustrate the user's view of the reflective surface, in the case of a partially reflective surface (FIG. 2A) and a fully reflective surface (FIG. 2B). In the case of FIG. 2A, the matter displayed on the screen 62 is superposed over the real background view (the house and car in this example), so allowing augmented reality techniques to be employed. In the arrangement of FIG. 2B, the background is obscured by the substantially fully reflective surface.

In embodiments of the invention, the reflective properties of the reflective surface may be altered by the user. In one example, a liquid crystal shutter may be employed behind the reflective surface (for example, on a rear surface, relative to the user in use, of the reflective surface) so as to vary between opacity and transparency in response to an electrical signal from a user control (not shown). In such an example, the head-mountable display device comprises a reflective element transparency control unit; and the reflective element comprises a liquid crystal shutter element operable to alter the transparency of the reflective element in response to an instruction issued by the reflective element transparency control unit.

In another example, the user may operate a mechanical shutter behind the reflective surface so as to vary the light transmission of the reflective surface, for example by moving a non-transparent shutter element movably mounted on the frame and operable to be moved into a position in which at least a portion of a surface of the reflective element other than the reflective surface is overlapped by the non-transparent shutter element, so that the amount of light incident upon the at least a portion of the surface of the reflective element is reduced. In this way, the user may choose between the arrangements of FIGS. 2A and 2B.

In the examples of FIGS. 2A and 2B, the matter 100 from the screen 62 has been distorted (by being bent or curved) by the reflection it has undergone. This is because of the curvature of the particular reflective surface used in this example, and does not indicate that all suitable reflective surfaces will cause such distortion. But in embodiments of the invention, distortions of this type can be compensated for by a complementary pre-distortion applied to the matter to be displayed on the screen 62. Such a pre-distortion can be applied by the mobile device 60, for example. It is possible instead to use a curved display screen 62, for example formed of an Organic Light Emitting Diode (OLED) screen. In some embodiments, the mobile device comprises a screen; an image generation unit operable to generate an image for being displayed on the screen and reflected in the reflective surface of the reflective element of the head-mountable display device; and an image warp compensation unit operable to warp or distort the generated image so as to compensate for a warped appearance of the image when it is reflected, the image warp compensation unit warping the generated image on the basis of one or more parameters related to the curvature of the reflective surface of the reflective element of the head-mountable display device; wherein the screen is operable to display the warp-compensated image.

It is noted here that some mobile or games devices of the type which may be used as the device 60 also comprise front-facing cameras. Here, the term "front facing" is used to indicate that the camera is on the same face of the mobile device as the screen 62, so that the camera captures an image of the user viewing the screen. Such cameras are sometimes used in video conferencing or similar applications. Such a camera 110 is located on the same face of the device 60 as the screen 62 in the example of FIG. 3.

Figure 3:
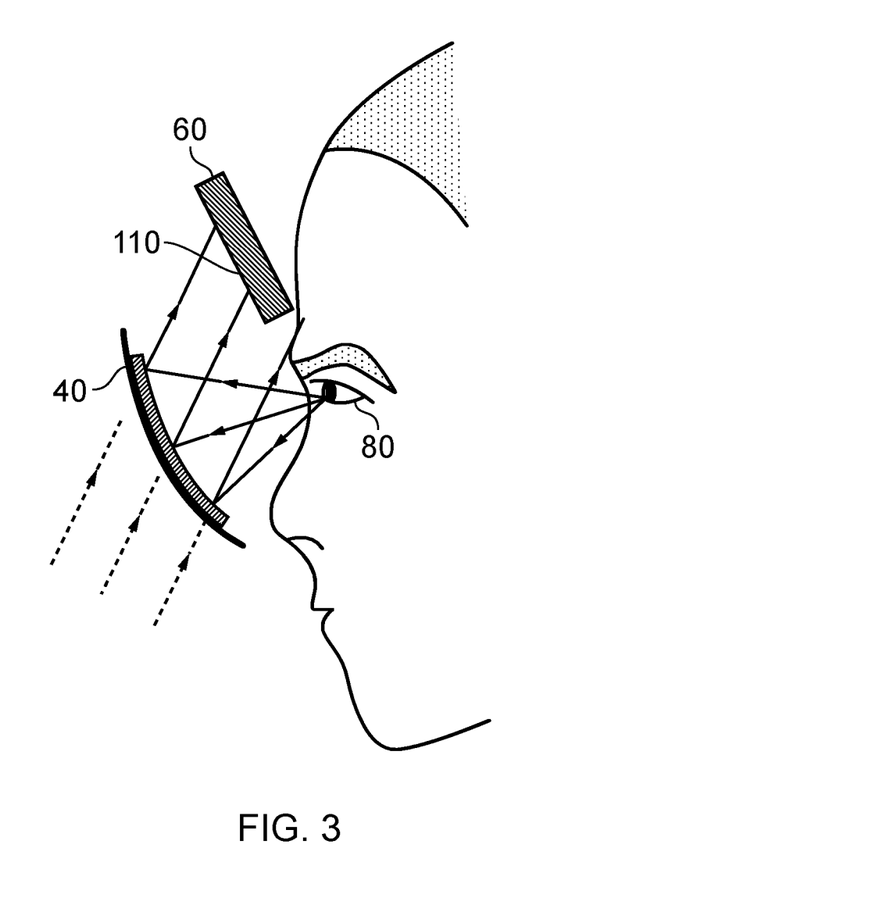
FIG. 3 shows an HMD including a front-facing camera.

Because the screen 62 is directed towards the reflective surface, and by reflection to the user's eyes, it follows that a front-facing camera such as the camera 110 will be directed towards the user's eyes, by virtue of the reflection by the reflective surface. Accordingly, in embodiments, the eye display position discussed above may also be considered (form the point of view of the camera) as a an eye-tracking reflection position.

This allows various possibilities, one being that of eye tracking.

In embodiments of the invention, the location and orientation in which the mobile device is held relative to the location and orientation of the reflective surface are such that, in use, the light arriving from the eye of the user is reflected by the reflective surface so that a reflected image of the eye of the user is within the field of view of a camera of the mobile device.

A suitable mobile device for use in such embodiments comprises a camera operable to capture an image comprising a reflected image of the eye of the user reflected by the reflective surface of the reflective element and comprising an image of a portion of the user's visual environment; an eye-tracking unit operable to determine a first portion of the captured image corresponding to the reflected image of the eye of the user and to perform eye-tracking processing on the first portion; and a location and mapping unit operable to determine a second portion of the captured image corresponding to the image of the portion of the user's visual environment and to perform location and mapping processing on the second portion (for example, in order to detect the current location of the camera and the current location, relative to the camera, of objects in the captured scene) by analysis of the captured images alone.

Image processing and location and mapping processes carried out by the mobile device may be performed by a data processor within the mobile device, under the control of appropriate computer software. Such software is considered to be an embodiment of the invention. The software may be provided by a storage or transmission medium such as a non-transitory machine readable storage medium (for example, a magnetic or optical disk or a non-volatile or read-only memory). Such media are also considered as embodiments of the invention.

The front-facing camera 110 can capture images of one or both of the user's eyes 80 during use of the display, and using known eye-tracking techniques the mobile device 60 can detect the direction in which the user is looking at a particular time. This information can be used so as to provide interaction with the matter 100 displayed to the user via the screen 62, or for monitoring the user's attentiveness to game features, advertising or the like, or to allow the user to control certain functions of the mobile device 60.

Figure 4A:
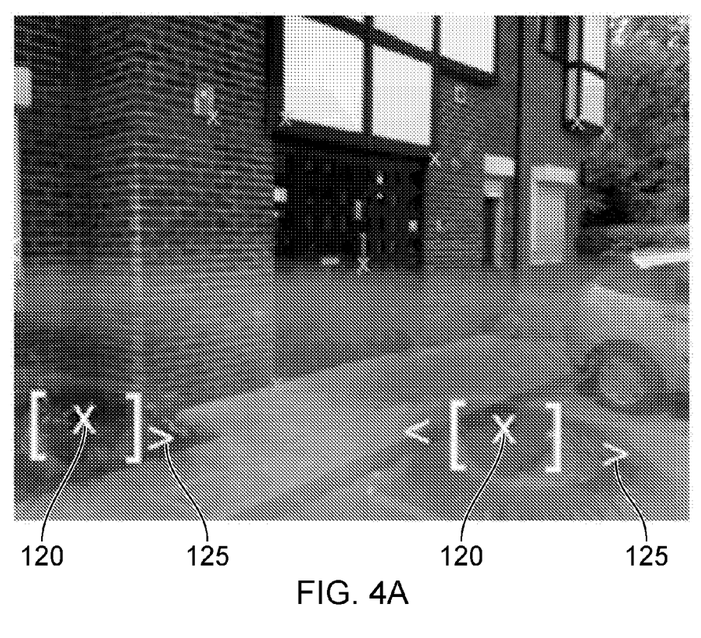
FIGS. 4A and 4B schematically illustrate an eye tracking process.
Figure 4B:
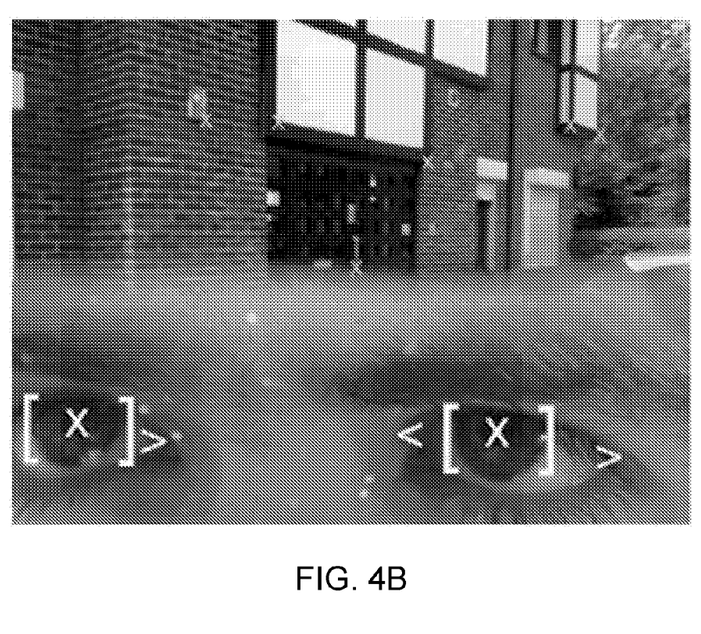

FIGS. 4A and 4B schematically illustrate the view of the front-facing camera 110 of the mobile device in the case of a partially transparent (partially reflective) mirror (FIG. 4A) and a fully reflective mirror (FIG. 4B). In each case, the eye position 120 of each eye and its direction of observation or movement 125 can be detected. In the case of FIG. 4A, the quality of the image captured of the user's eyes will be less than that obtained in FIG. 4B, but the system does have the advantage that the front-facing camera can detect what the user is looking at (the background scene). In FIG. 4B the image quality is higher but the camera cannot detect what the user is looking at.

Figure 5A:
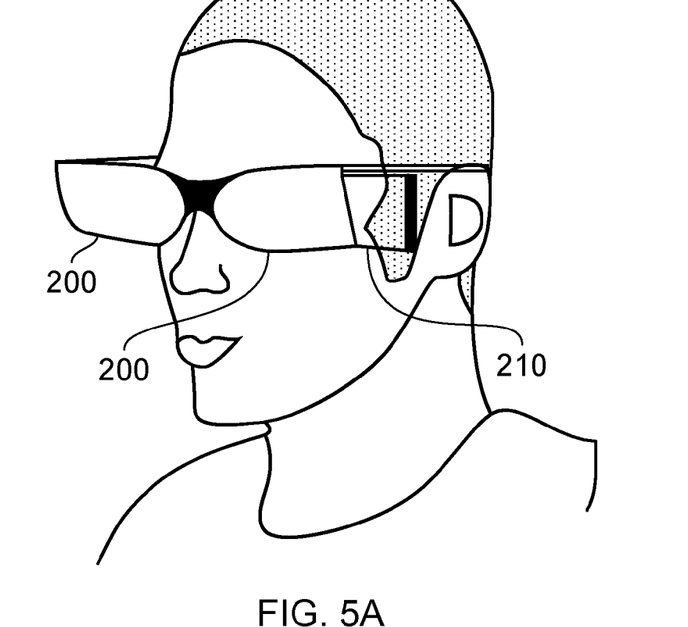
FIGS. 5A and 5B schematically illustrate another embodiment of HMD.
Figure 5B:
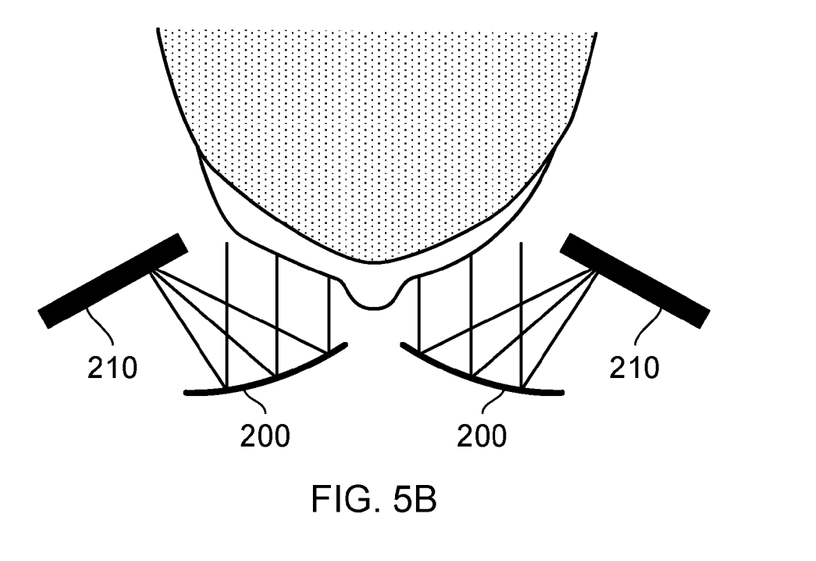

FIGS. 5A and 5B schematically illustrate an alternative arrangement involving two mobile devices having display screens 210 and two respective reflective surfaces 200, one for each eye. The fact that the mobile devices are displaced laterally with respect to the user's head (rather than above) allows the front-facing cameras of the mobile devices (if provided) to obtain, between them, a stereoscopic view of the ambient surroundings.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the invention.

Numerous modifications and variations of the present disclosure are possible in light of the above teachings. It is therefore to be understood that within the scope of the appended claims, the invention may be practised otherwise than as specifically described herein.

The invention claimed is:

1. A mobile device for being held by a mobile device holder of a head-mountable display device, the head-mountable display device comprising: a frame to be mounted onto a user's head, the frame defining an eye display position which, in use, is positioned in front of an eye of the user; a reflective element mounted with respect to the eye display position, the reflective element comprising a reflective surface which, in use, is visible to the eye of the user; and a mobile device holder configured to hold a mobile device at a location and orientation on the frame; wherein: the reflective surface is configured to reflect light incident upon the reflective surface so as to form a reflected image; and the location and orientation in which the mobile device is held relative to a location and orientation of the reflective surface are such that, in use, light arriving from a screen of the mobile device held in the mobile device holder is reflected by the reflective surface so that a reflected image of at least a portion of the screen is visible to the user, the mobile device comprising:
   a screen;
   an image generation unit operable to generate an image for being displayed on the screen and reflected in the reflective surface of the reflective element of the head-mountable display device;
   an image warp compensation unit operable to warp the generated image so as to compensate for a warped appearance of the image when it is reflected, the image warp compensation unit warping the generated image on the basis of one or more parameters related to curvature of the reflective surface of the reflective element of the head-mountable display device, wherein the screen is operable to display the warp-compensated image;

a camera operable to capture an image comprising a reflected image of the eye of the user reflected by the reflective surface of the reflective element and comprising an image of a portion of the user's visual environment;

an eye-tracking unit operable to determine a first portion of the captured image corresponding to the reflected image of the eye of the user and to perform eye-tracking processing on the first portion; and a location and mapping unit operable to determine a second portion of the captured image corresponding to the image of the portion of the user's visual environment and to perform location and mapping processing on the second portion.

2. A head-mountable device, comprising:

a frame to be mounted onto a user's head, the frame defining an eye-tracking reflection position which, in use, is positioned in front of an eye of the user;

a reflective element mounted with respect to the eye-tracking reflection position, the reflective element comprising a reflective surface which is located and orientated so as to, in use, reflect light arriving from the eye of the user; and a mobile device holder configured to hold a mobile device at a location and orientation on the frame;

wherein:

the reflective surface is configured to reflect light incident upon the reflective surface so as to form a reflected image;

the location and orientation in which the mobile device is held relative to the location and orientation of the reflective surface are such that, in use, the light arriving from the eye of the user is reflected by the reflective surface so that a reflected image of the eye of the user is within a field of view of a camera of the mobile device; and the location and orientation in which the mobile device is held are such that, in use, a portion of the user's visual environment is within the field of view of the camera of the mobile device.

3. A device according to claim 2, wherein the reflective element is semi-transparent.

4. A device according to claim 3, comprising:

a non-transparent shutter element movably mounted on the frame and operable to be moved into a position in which at least a portion of a surface of the reflective element other than the reflective surface is overlapped by the non-transparent shutter element, so that an amount of light incident upon the at least a portion of the surface of the reflective element is reduced.

5. A device according to claim 2, wherein:

the head-mountable device comprises a reflective element transparency control unit; and the reflective element comprises a liquid crystal shutter element operable to alter transparency of the reflective element in response to an instruction issued by the reflective element transparency control unit.

* * * * *